Nov. 20, 1962     C. P. ZUPIC ETAL     3,065,097
METHOD OF DUSTING FLEXIBLE FILM TUBING INTERNALLY
Filed Jan. 20, 1960
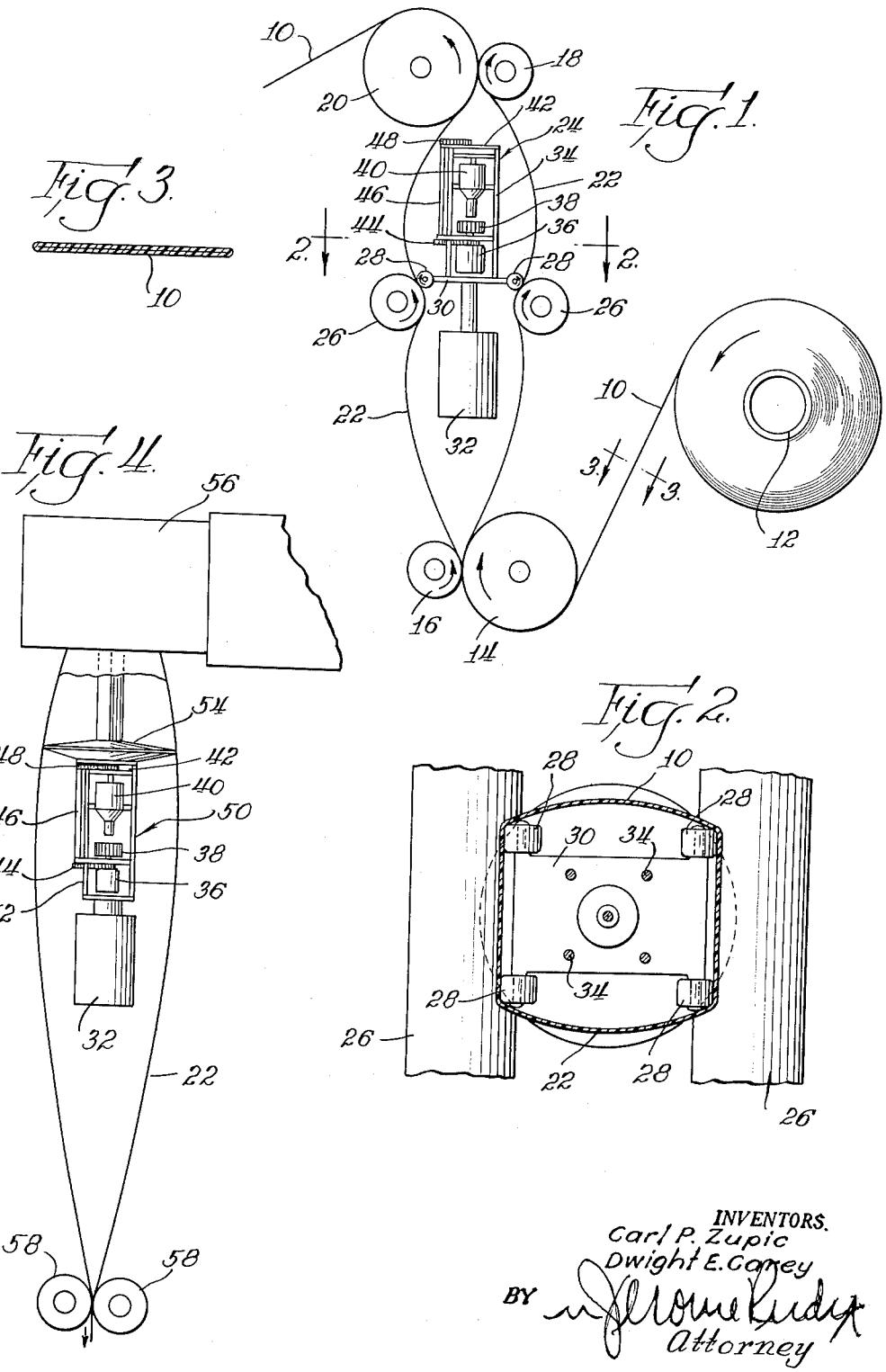
INVENTORS.
Carl P. Zupic
Dwight E. Carey
BY *Jerome Ludy*
Attorney United States Patent Office 3,065,097
Patented Nov. 20, 1962

3,065,097
METHOD OF DUSTING FLEXIBLE FILM TUBING
INTERNALLY
Carl P. Zupic, Midland, and Dwight E. Carey, Bay City, Mich., assignors to The Dow Chemical Company, Midland, Mich., a corporation of Delaware
Filed Jan. 20, 1960, Ser. No. 3,684
8 Claims. (Cl. 117—18)

This invention relates to a method and means for overcoming the blocking characteristics of various thin flexible films, and more particularly, to a method and means for the dusting of such films to overcome such blocking.

Many thin flexible films display a blocking characteristic, that is, an inability for adjoining sheets to readily slip upon each other, or to be easily separated. Such films in tube form are not suitable for bag or container fabrication unless the blocking characteristic is eliminated. Various methods have been proposed and utilized for eliminating, or minimizing, such characteristic of films, with varying degrees of success. For example, one method relates to the use of certain agents which are added to the film material before extrusion, which agents tend to change the film surface to overcome blocking. The disadvantage of such method is that such agents may be deposited, or accumulated, on the dies and sizing devices, thus causing undesirable effects, such as marring of film surface, or the actual rupture thereof. Another method involves the use of a porous dust bag for the dispersion of an agent in powdered form. The disadvantage of this method is that a non-uniform dusted surface is obtained, plus the further disadvantage of marring the film surface by direct contact therewith by the dust bag. Other arrangements for interior dusting of thin flexible film tubing have been proposed, but generally are unattractive because of complexity, non-uniform results, or other reasons.

The method and means of the present invention not only provides a simple and satisfactory solution to the problem of eliminating blocking characteristics of thin flexible films, but also avoids the shortcomings of various known procedures, as set forth above. Briefly, the invention contemplates the use of an integral or self-powered dusting mechanism which is positionally maintained within an inflated region of the flexible film tubing as the tubing is being processed. The dusting mechanism comprises a hopper for the dusting material, a dust metering device for feeding the dusting material to the inside of a squirrel cage type fan, a drive motor for the fan, and a battery for powering the motor. The dusting mechanism may be placed in the tubing either as it is unreeled from an inventory roll, or immediately after the sizing die as the tubing is being fabricated. In either location, the dusting mechanism operates to disperse the dusting material in a cloud which produces a uniformly dusted surface upon the interior of the film tubing to thus overcome the blocking characteristic of the tubing.

The main object of this invention is to provide a method and means for overcoming the blocking characteristics of various thin flexible films.

A more specific object is to provide a method and means for dusting the interior of thin flexible film tubing to overcome the blocking characteristics thereof.

Another object is to provide a dusting mechanism which produces a uniformly dusted surface upon the interior of a thin flexible film tubing to overcome the blocking characteristics of the tubing.

Still another object of the invention is to provide a flexible film tube dusting mechanism which may be placed in the tubing either as it is unreeled from an inventory roll, or immediately after a sizing die as the tubing is being fabricated.

Another object of the invention is to provide a flexible film tube dusting mechanism which is completely self-contained, simple in structure, rapid in action, and consistent in results.

These and further objects and features of the invention will become more apparent from the following description and accompanying drawing wherein:

FIG. 1 is a schematic illustration representing one embodiment of the invention;

FIG. 2 is an enlarged section view generally as seen from line 2—2 in FIG. 1;

FIG. 3 is an enlarged section view generally as seen from line 3—3 in FIG. 1; and FIG. 4 is a schematic illustration representing another embodiment of the invention.

Referring now to the drawing, numeral 10 identifies a moving tube of thin flexible material, made from polymeric formulations, such as saran plastic film of the type made by the Dow Chemical Company, which tube is being unwound in deflated form from an inventory roll 12, and is made to traverse a path leading from the roll 12, to lower pinch rolls 14, 16, upper pinch rolls 18, 20, and onward either to a further inventory roll (not shown), or to machinery using the tube in packaging, or other operations. Between the lower and upper pinch rolls, the tube is inflated, as by compressed air, to form a cylindrical, but not necessarily taut, bubble 22.

A self-powered dusting device, or mechanism, 24 representing one embodiment illustrating the means of the invention, is arranged within the bubble 22, and is positionally maintained therein by elongated rollers 26 which support the device 24 by virtue of wheels, or rollers 28 forming part of the device 24. The tube 10 passes between the wheels 28 and the rollers 26.

The dusting device 24 includes: a rectangular platform, or support plate, 30 to which the wheels 28 are rotatably affixed at the four corners thereof; a battery 32 which is suspended from the platform 30 and which, due to its relatively great weight, serves to maintain the device 24 in upright position during dusting operations; a frame means 34 extending upwardly from the platform 30 and supporting a combination including, an electric motor 36, a squirrel cage fan, or blower 38, a hopper 40, and an agitating, or stirring means 42. The hopper 40 is arranged to gravity feed a regulated amount of dusting material into the blower 38, which, being rapidly rotated by the motor, throws the material out in a horizontal direction, creating a dust cloud which deposits a fine and uniform coating upon the interior of the tube 10. The stirring means 42, which includes a paddle (not shown) extending into the hopper 40, is driven by a power takeoff from the motor, including lower gear means 44, shaft 46, and upper gear means 48. Electrical connection (not shown) is provided between the battery 32 and motor 36. The dusting material may be of various types depending upon the use for which the film tube is intended. For example, the dusting material may be a micropulverized starch when the tube is to be used for food wrapping purposes, or a micro-pulverized mica when the tube is to be used for industrial purposes.

To the position the dusting device 24 within the flexible film tube 10, the latter is first threaded through the lower pinch rolls 14, 16, and between rollers 26. A slit is then made in the tube, compressed air is fed through a flexible hose inserted in the slit. The compressed air inflates the tube so that a bubble is formed. The loose tube end is then drawn through the upper pinch rolls 18, 20, to confine the bubble between the two sets of pinch rolls. Another slit is then made in one side of the film tube, prior to pinch rolls 14, 16, and as the region of tubing having this slit, passes through pinch rolls 14, 16, and is inflated between the pinch rolls and rollers 26, the dusting device is inserted within the tube through the slit. More compressed air is now added to the partially inflated tubing (since most of the air escaped when the dusting device was inserted), and the tubing is advanced so that the air is trapped again between the upper and lower pinch rolls. Either of the pinch roll sets are adjustable to move them closer toward each other to further confine the entrapped air, thus decreasing the bubble volume and increasing the internal pressure thereof, to "round out" the shape of the bubble so that the dusting material is uniformly applied. After the dusting mechanism is arranged in position, motor operation is initiated and dusting action is begun.

A second embodiment of the means of the invention illustrated in FIG. 4 is similar in structure and operating principle to the above described embodiment, and for the sake of brevity, elements in common between the two embodiments, will be identified by use of identical numbers. The FIG. 4 embodiment is for use near the point of flexible film tubing fabrication, that is, in a location wherein the tubing will be interiorly dusted after leaving a sizing die.

Referring now to FIG. 4, a dusting mechanism 50 includes: a battery 32, suspended from a frame means 52 which is attached to the lower side of a sizing die 54 arranged for cooperation with a flexible film extruder head 56; and a blower 38, dust hopper 40, and stirring means 42, all of which are supported by the frame means 52, as shown. The stirring means 42 including a paddle (not shown) arranged in the hopper is driven by the motor 36, via gears 44, shaft 46 and gears 48. The dusting mechanism 50 is arranged within the air filled bubble 22, the lower end of which is closed by a set of vertically adjustable pinch rolls 58.

It will be apparent from the foregoing that both embodiments of the means of the invention may be utilized to achieve the objectives of the invention as set forth in the early part of the specification.

The foregoing description has been given in detail without thought of limitation since the inventive principles involved are capable of assuming other forms without departing from the spirit of the invention or the scope of the following claims.

What is claimed is:

1. A method for overcoming the blocking characteristics of various thin polymeric type tubing comprising the steps of threading the tubing through two sets of pinch rolls, forming a bubble in the tubing between said rolls by use of compressed air, placing a self-powered dusting mechanism including a blower within said bubble and supporting it therein by means of rollers arranged exteriorly of said tubing, initiating operation of said blower to create a dust cloud, and moving the tubing in one direction through the rolls.

2. A dusting mechanism for dusting the interior of a thin flexible tube which is being moved in a vertical direction between a pair of supporting rollers comprising in combination, a frame means including a platform having rollers affixed at opposite edges which rollers are adapted to be supported by the supporting rollers, a battery suspended from the platform below the platform rollers, a blower supported by the frame means above said platform so that the axis of rotation extends in the direction of the longitudinal axis of the tube, a motor supported by the frame means and arranged between the platform and the blower for rotation of the blower, means to connect the battery to the motor for operation thereof, a hopper supported by the frame means and arranged on the other side of the blower and adapted for feeding dusting material into the blower at a predetermined rate, a stirring means for agitating dusting material in the hopper to assure free flow thereof, and means interconnecting the motor and stirring means so that the motor can activate the stirring means.

3. A dusting mechanism for dusting the interior of a thin flexible tube which is being moved in a vertical direction between a pair of elongated rollers comprising in combination, a frame means including a rectangular platform having rollers affixed at each of the four corners adapted for support by said elongated rollers, a battery suspended from the platform below the platform rollers, a squirrel cage fan supported by the frame means above said platform so that the axis of rotation extends in the direction of the longitudinal axis of the tube, a motor supported by the frame means and arranged between the platform and the fan for rotation of the fan, means for electrical connection of the battery and the motor, a hopper supported by the frame means and adapted for gravity feeding of dusting material into the fan, a stirring means for agitating dusting material in the hopper to assure free flow thereof, and a power takeoff from the motor for operation of said stirring means, said power takeoff including upper and lower gear means, and an interconnecting shaft.

4. In a machine for extruding a thin plastic tubing and having an extruding head and a sizing die affixed to the extruding head, a tube dusting device arranged for enclosure by the extruded tubing and including a frame means affixed to the sizing die, a battery supported by the frame means, a blower supported by the frame means with the axis of rotation extending in the direction of the longitudinal axis of the extruded tubing, a motor supported by the frame means and arranged for rotation of the blower, electrical connection means between the battery and the motor, and a hopper supported by the frame means arranged for feeding dusting material into the blower at a predetermined rate.

5. A tube dusting device according to claim 4, wherein a stirring means is arranged for agitation of the dusting material in the hopper, said stirring means being connected for operation by said motor.

6. A method for overcoming the blocking characteristics of various thin polymeric type tubing comprising the steps of, arranging the tubing for movement in a longitudinal direction, admitting a pressure medium to the tubing to form a bubble, arranging a self-powered dusting mechanism including a blower within the bubble and supporting it so that the axis of the blower extends in the longitudinal direction of the tubing, initiating operation of said blower to create a dust cloud, and moving the tubing past the dusting mechanism.

7. A method for overcoming the blocking characteristics of various thin polymeric type tubing comprising the steps of, forming a bubble in the tubing between an extruding head and a set of pinch rolls, placing a self-powered dusting mechanism including a blower within the bubble and supporting it by attachment to the extruding head, and initiating operation of the blower to create a dust cloud within the bubble as the tubing moves past the dusting mechanism.

8. A dusting mechanism for dusting the interior of a thin flexible tube which is being moved in a longitudinal direction comprising in combination, a frame means, a blower supported by the frame means, a motor supported by the frame means for operation of the blower, a battery supported by the frame means for operation of the motor, a hopper supported by the frame means and adapted for feeding dusting material into the blower at a predetermined rate, a stirring means for agitating dusting material in the hopper to assure free flow thereof, frame supporting means to maintain the dusting mechanism within the tube so that the axis of rotation of the blower extends in the longitudinal direction of the tube, and means to support said frame means against longitudinal movement relative to the tube.

References Cited in the file of this patent
UNITED STATES PATENTS

| | | |
|---|---|---|
| 2,099,346 | Perkins | Nov. 16, 1937 |
| 2,476,140 | Francis | June 12, 1949 |
| 2,634,459 | Irons | Apr. 14, 1953 |
| 2,800,875 | Jewell | July 30, 1957 |
| 2,910,961 | McIntire et al. | Nov. 3, 1959 |